United States Patent [19]

Coleman

[11] 4,370,738
[45] Jan. 25, 1983

[54] VIDEO DISC PLAYER HAVING RECORD RETAINING MECHANISM

[75] Inventor: Clyde F. Coleman, Crawfordsville, Ind.

[73] Assignee: RCA Corporation, New York, N.Y.

[21] Appl. No.: 210,464

[22] Filed: Nov. 21, 1980

[51] Int. Cl.³ .................... G11B 25/04; G11B 17/04
[52] U.S. Cl. .................................................. 369/77
[58] Field of Search ..................... 369/77, 261, 287; 358/128.5, 128.6; 360/99, 133

[56] References Cited

U.S. PATENT DOCUMENTS

| 4,133,540 | 1/1979 | Torrington | 369/77 |
| 4,159,827 | 7/1979 | Torrington | 369/77 |

Primary Examiner—Harry N. Haroian
Attorney, Agent, or Firm—E. M. Whitacre; J. S. Tripoli; D. A. Kulkarni

[57] ABSTRACT

In a video disc player, an empty jacket is inserted into the player to retrieve a retained record. A pair of retractable retaining pins are arranged in the player to hold the record in place as the jacket is inserted into the player. The retaining pins are retracted just before the jacket could contact the pins.

8 Claims, 8 Drawing Figures

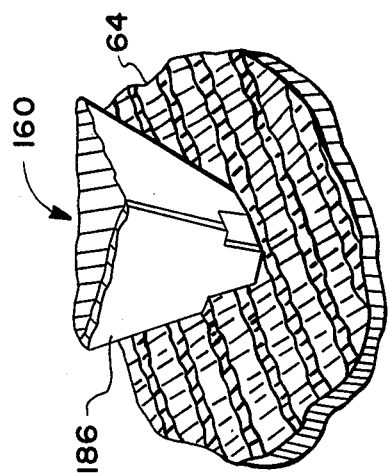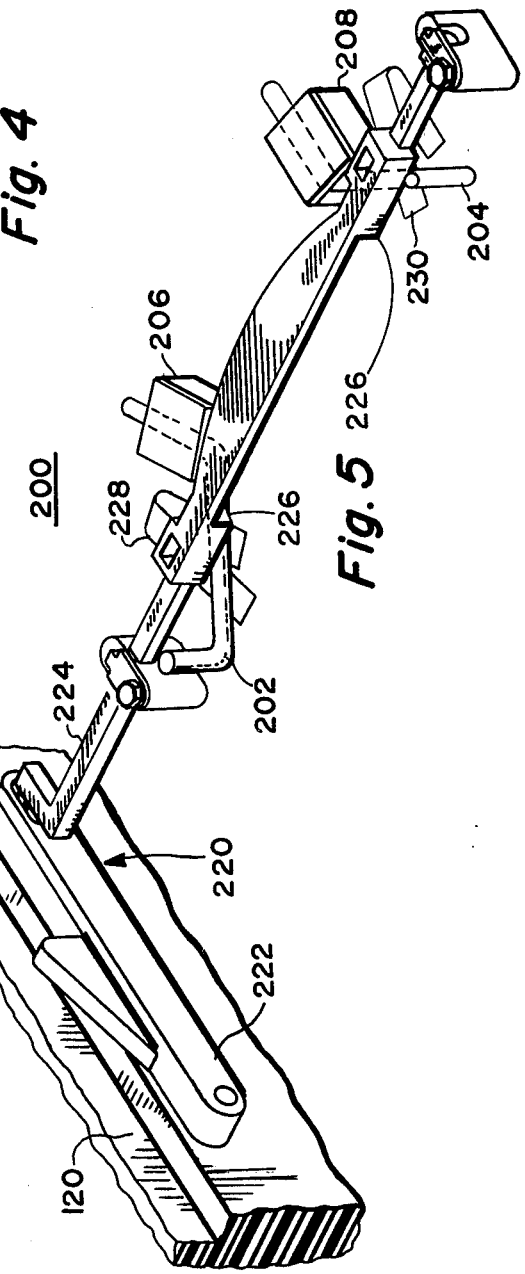

VIDEO DISC PLAYER HAVING RECORD RETAINING MECHANISM

This invention relates to a record player. More particularly, it relates to a player, wherein a record is loaded into, and retrieved from, the record player by means of a protective record caddy.

In certain systems, video information is stored on a disc record in the form of geometric variations in a continuous spiral track disposed on the record surface. The variations in capacitance between an electrode carried by a record-engaging stylus and a conductive property of the record are sensed to reproduce the stored information. A capacitance-type pickup system is illustratively disclosed in U.S. Pat. No. 3,842,194 (Clemens).

To protect the video disc record, it is beneficial to enclose it in a planar caddy which comprises an outer jacket and a record retaining spine. The spine is provided with an opening in which a record is received forming a record/spine assembly. For record loading, a full caddy is inserted into the player along side rails. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the retained spine in place while allowing the retained record to be picked up by the turntable when it is raised. During playback, the pickup stylus is traversed radially across the record while the turntable revolves the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket. U.S. patent application, Ser. No. 122,959, entitled "STYLUS CLEANING APPARATUS FOR VIDEO DISC PLAYER", U.S. Pat. No. 4,285,524 filed in the name of L. M. Hughes et al., illustrates a caddy-type video disc player.

In a caddy player of the afore-mentioned type, the jacket has a tendency to push the record forward when the jacket is reinserted into the player for record retrieval, which, in turn, may cause the record to get pushed out of the opening in the spine and get jammed between the spine and the jacket. It is desirable to prevent such occurrences.

Pursuant to this invention, the player is provided with a pair of retractable pins. When the jacket is reinserted into the player for record retrieval, it pushes the record forward against the retractable pins, thereby keeping the record in the opening disposed in the spine. The pins are retracted through a linkage just prior to any engagement between the jacket and the retractable pins to allow complete insertion of the jacket into the player.

Figure 1:
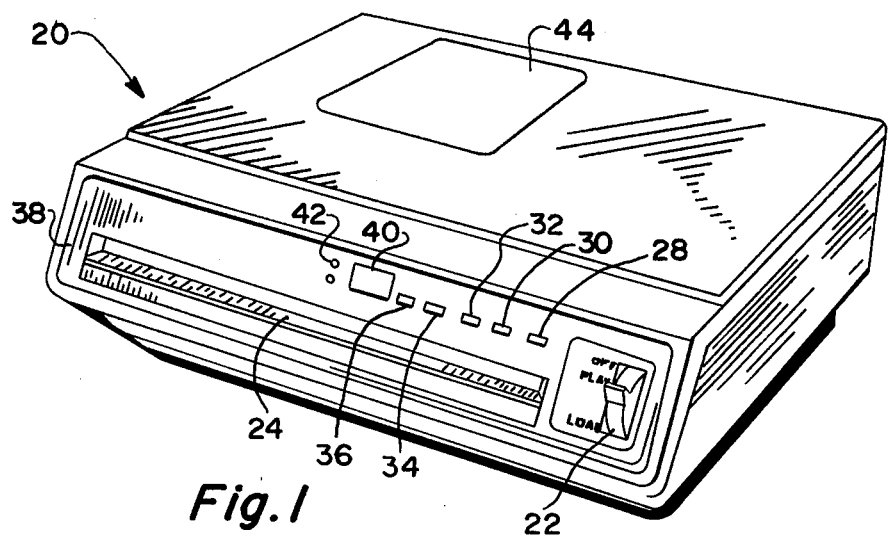
FIG. 1 shows a video disc player incorporating the present record retaining mechanism.
Figure 3:
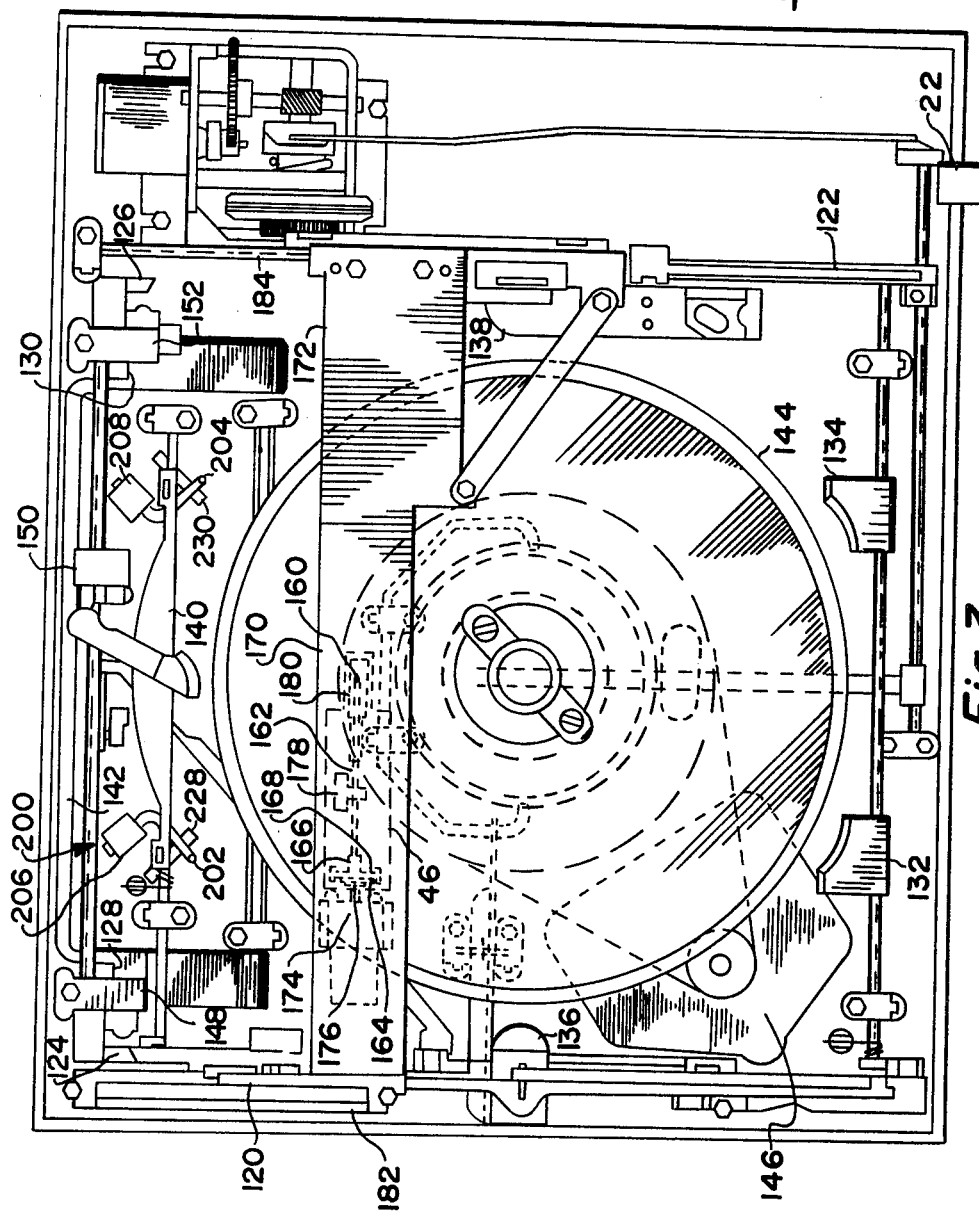
Figure 6:
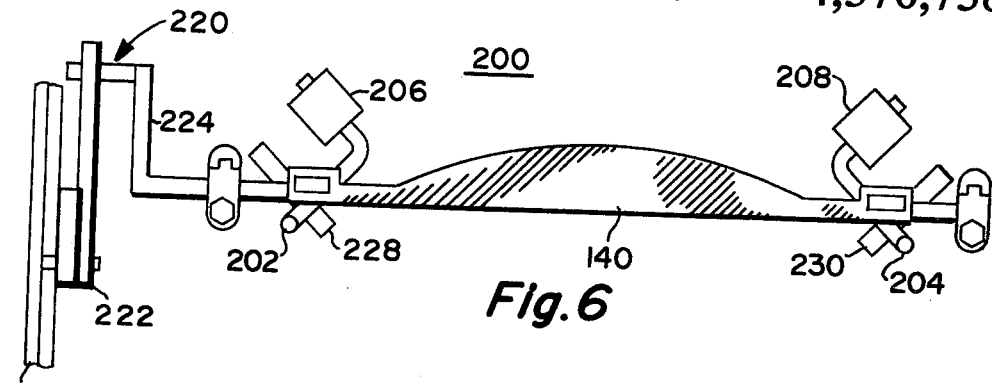
Figure 7:
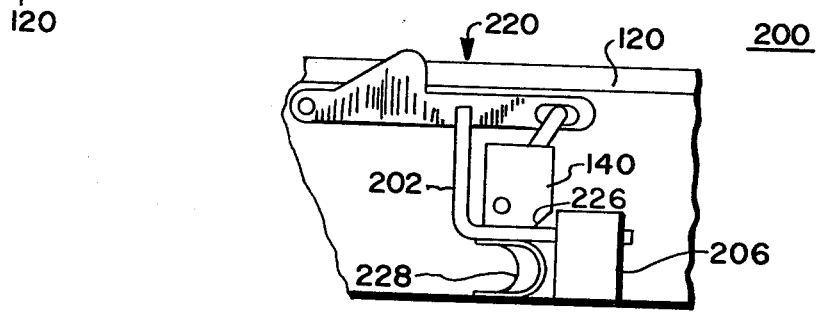
Figure 8:
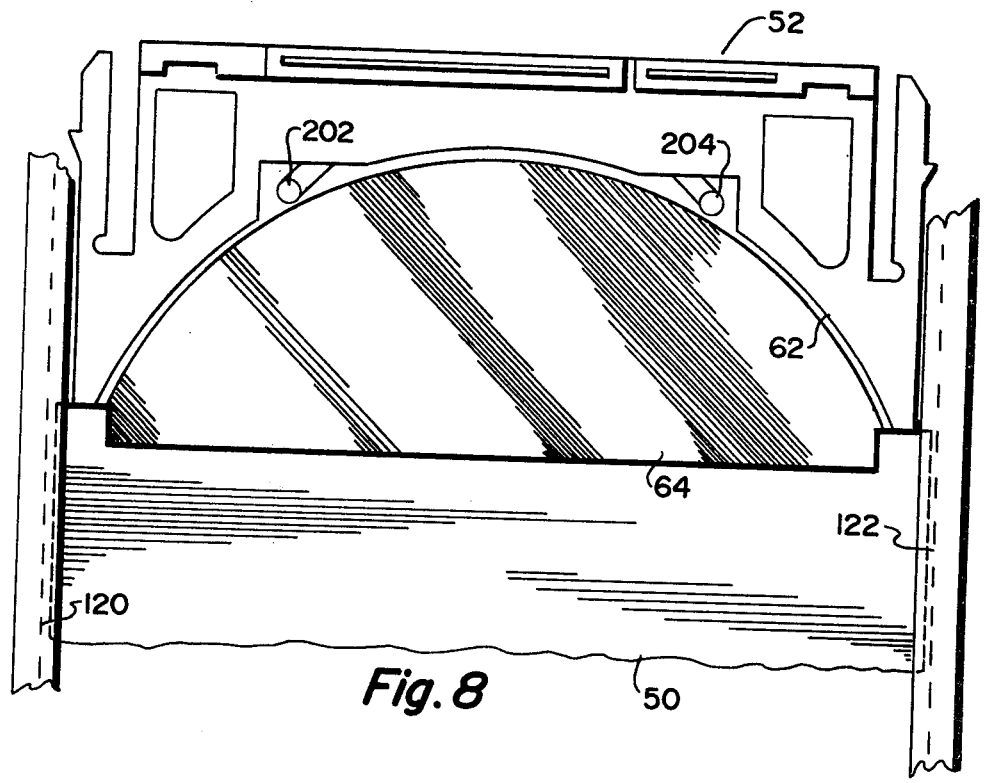

FIG. 3 provides a plan view of the player of FIG. 1;

FIG. 4 depicts the capacitance pickup concept employed in the player of FIGS. 1 and 3;

FIG. 5 gives an enlarged perspective view of the instant record retaining mechanism;

FIGS. 6 and 7 provide a top view and an end view of the present record retaining mechanism; and FIG. 8 illustrates the operation of the subject record retaining mechanism.

Shown in FIG. 1 is a video disc player 20 having the instant record retaining mechanism 200. A function lever 22 is subject to disposition in any one of three positions—OFF, PLAY and LOAD/UNLOAD. A door flap closes a caddy input slot 24 when the function lever 22 is disposed in the OFF and PLAY positions. In the LOAD/UNLOAD position of the function lever 22, the door flap is opened to permit insertion of a caddy 26, shown in FIG. 2, into the player to load an enclosed record therein. A pushbutton 28 is provided to dispose the player in the "PAUSE" mode. A set of pushbuttons, 30, 32, 34 and 36 are arranged on the instrument panel 38 to dispose the player in any one of four "SEARCH" modes, i.e., rapid access (forward/reverse) and visual search (forward/reverse). A digital readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A door 44 is disposed on the cover of the player to provide access to a stylus cartridge 46 which is shown in FIG. 4.

Figure 2:
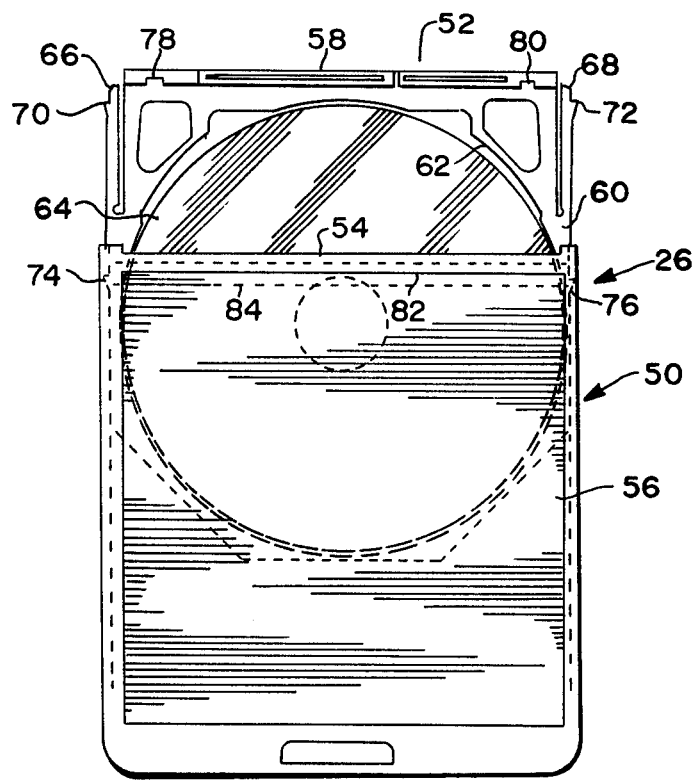
FIG. 2 illustrates a video disc caddy suitable for use with the subject record retaining mechanism in the practice of the present invention.

As shown in FIG. 2, the video disc caddy 26 comprises a jacket 50 and a substantially planar, record retaining spine 52. The jacket 50 has an edge opening 54 in communication with a cavity 56 for enclosing the record/spine assembly. The spine 52 has a portion 58 which serves as a closure, and a further portion 60 having a circular opening 62 for receiving a centrally-apertured record 64. The spine 52 is further provided with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for locking the spine 52 in place when it is fully inserted therein. The spine 52 is provided with cutouts 78 and 80 for selectively receiving the spine gripper members mounted in the player to secure the spine thereto in the manner explained later. Disposed inside the jacket 50, near the edge opening 54 thereof, are a pair of lip pads 82 and 84. The lip pads 82 and 84 serve to keep the dust and the debris out and to wipe the record each time it is inserted into the jacket 50.

The operation of the caddy extraction mechanism will now be explained in conjunction with FIG. 3. To load a record into the player, a caddy 26 is guided into the input slot 24 along a path defined by side rails 120 and 122. As the caddy arrives at a fully inserted position in the player, latch defeat members 124 and 126 enter the jacket 50 to defeat the spine latch fingers 66 and 68 for freeing the spine 52 from the jacket. Pivotally mounted in the player are spine gripper members (only one of which can be seen in FIG. 3 and has been identified as 130) which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 124 and 126 and is latched to the player through the operation of the spine gripper members (e.g., 130), subsequent withdrawal of the jacket leaves the record/spine assembly in the player. The retained record/spine assembly is supported on a set of depressible receiving pads 132, 134, 136, 138 and 140. A pair of springs (not shown) disposed between a gripper arm 142, which carries the spine gripper members (e.g., 130), and the latch defeat members 124 and 126 effect downward deflection of the latch defeat members upon jacket withdrawal.

To transfer the retained record to a turntable 144, the function lever 22 is displaced to the PLAY position, which, in turn, raises the turntable and starts a turntable motor 146. A set of hold-down members 148, 150 and 152 hold the retained spine 52 in place against the receiving pads 132, 134, 136, 138 and 140 while permitting the retained record to be intercepted by the turntable 144 when it is raised. The hold-down members 148, 150 and 152 also serve to accurately locate the retained spine 52, longitudinally and laterally, in the player.

A pickup stylus 160 is disposed at one end of a stylus arm 162, the other end of which is secured to a latch plate 164 by means of a rubber coupler 166. The latch plate 164, in turn, is suspended in the cartridge 46 by means of a rubber diaphragm 168. The cartridge 46 is placed in a compartment 170 provided in a stylus arm carriage 172, and the carriage lid, not shown, is closed. Disposed in the carriage 172 is a slidably-mounted arm-stretcher transducer 174 (e.g., of the type described in U.S. Pat. No. 3,983,318) which is provided with a latch cup 176 subject to engagement with the latch plate 164. The transducer 174 is advanced in response to the closure of the cartridge lid to establish connection between the latch plate 164 and the latch cup 176.

A stylus arm lifting/lowering mechanism 178 (for example, of the general variety shown in U.S. Pat. No. 4,053,161) is mounted in the carriage 172 to selectively lower the pickup stylus 160 through an opening 180 provided in the bottom wall of the carriage to effect record engagement. During playback, the carriage 172 is translated on guide ways 182 and 184 disposed parallel to the caddy side rails 120 and 122 from a starting position at the back of the player toward the front of the player in synchronism with the radially inward motion of the pickup stylus 160. In the manner indicated in FIG. 4, the variations in capacitance between an electrode 186 carried by the stylus 160 and a conductive property of the record 64 are sensed to reproduce the stored information on the record. The recovered signals are processed to reconstruct a television signal containing picture and sound information for application to a television receiver.

To transfer the record back to the receiving pads 132, 134, 136, 138 and 140 after playback, the function lever 22 is depressed to the LOAD/UNLOAD position, which, in turn, lowers the turntable 144 to a level below the receiving pads. When the turntable 144 is lowered, the record is deposited on the receiving pads 132, 134, 136, 138 and 140 for reception in the opening 62 disposed in the spine 52 to redefine the record/spine assembly. The turntable motor 146 is shut off when the function lever 22 is displaced to the LOAD/UNLOAD position. The location of the receiving pads 132, 134, 136, 138 and 140, occupying the raised position thereof, is such that the record/spine assembly is aligned with the center line of the caddy side rails 120 and 122.

To retrieve the record/spine assembly, the empty jacket 50 is inserted into the player through the input slot 24 along the caddy side rails 120 and 122. As the jacket 50 arrives at the fully inserted position, the front edge thereof engages the already deflected latch defeat members 124 and 126 to cause further downward deflection thereof. Such further downward deflection of the latch defeat members 124 and 126, in turn, effects downward displacement of the spine gripper members (e.g., 130), whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

As previously indicated, the frictional force between the record and the lip pads 82 and 84, disposed inside the jacket 50, is sometimes sufficient to force the record forward and out of the opening 62 provided in the spine 52, which might then cause the record to get trapped between the spine 52 and the jacket. The instant record retaining mechanism 200, which holds the record in place during jacket insertion, includes a pair of retractable retaining pins 202 and 204 pivotally mounted in the player, as shown in FIGS. 5-7, by means of mounting blocks 206 and 208. When an empty jacket is inserted into the player to retrieve a record, it pushes the record forward against the pins 202 and 204 in the manner shown in FIG. 8. The pins 202 and 204 retain the record in the opening 62 arranged in the spine 52, and prevent the record from being jammed between the spine and the jacket 50.

The retaining pins 202 and 204 are retracted out of the jacket insertion path by means of a linkage 220 which is activated just before the jacket could contact the pins. At this point, the record is sufficiently sandwiched between the jacket lip pads 82 and 84 to restrict the record to the opening 62 in the spine 52. As an empty jacket or a caddy is inserted into the player, the front edge thereof depresses an actuating cam 222. The motion of the actuating cam 222 causes the rear receiving pad 140, fixedly disposed on a shaft 224, to rotate out of the jacket insertion path. The cam surfaces 226, arranged on the underside of the rear receiving pad 140, cause the retaining pins 202 and 204 to retract. A pair of leaf springs 228 return the rear receiving pad 140 and the retaining pins 202 and 204 to their original positions when the jacket 50 is withdrawn.

The retaining pins 202 and 204 are mounted in the blocks 206 and 208 at an angle such that the force exerted by the record on the retaining pins 202 and 204 cannot cause the retaining pins to retract. The retaining pins 202 and 204 are adjustable in their respective mounting blocks 206 and 208 to allow proper positioning of the pins with respect to the spine.

What is claimed is:

1. In a player for recovering prerecorded information from a turntable-supported record during playback; said record being enclosed in a cover having an edge opening in communication with a record enclosing cavity; said player having an input slot through which an occupied cover is inserted along a path to load an enclosed record therein; said player including a record extracting mechanism for removing said enclosed record from said cover during cover withdrawal subsequent to an occupied cover arrival at a fully inserted position in said player, thereby retaining said record in said player resting on a record supporting platform; an empty cover being inserted into said player along said path for retrieving said retained record into said cover; apparatus comprising:

(A) a first member mounted in said player; the location of said first member being such that a peripheral portion of said retained record is urged forward into engagement with said first member by an empty cover, as said empty cover is inserted into said player for record retrieval, to hold said record in place during said cover insertion; and (B) means for retracting said first member out of said cover insertion path just prior to any engagement between said cover and said first member, as said empty cover is inserted into said player, to allow further insertion of said cover into said player.

2. Apparatus as defined in claim 1 wherein said retracting means is responsive to the insertion of said cover into said player.

3. Apparatus as defined in claim 1 wherein said apparatus further includes a second member; said retracting means additionally serving to retract said second member.

4. In a player for recovering prerecorded information from a turntable-supported record during playback; said record being enclosed in a caddy comprising a jacket having an edge opening in communication with a record enclosing cavity and a record retaining spine subject to insertion into said jacket; said spine defining a first portion forming a closure for said edge opening, and a further portion having a perimetrical wall defining an opening in which said record is received to form a record/spine assembly; said player having an input slot through which an occupied caddy is inserted along a path to load an enclosed record therein; said player including a record extracting mechanism for removing said retaining spine from said jacket during jacket withdrawal subsequent to an occupied caddy arrival at a fully inserted position in said player, thereby retaining said record/spine assembly in said player resting on a record supporting platform; said record receiving opening in said spine being larger than said record for allowing free passage of said record therethrough to permit transfer of said retained record from said platform to said turntable for playback, and from said turntable to said platform to redefine said record/spine assembly for record retrieval; an empty jacket being inserted into said player along said path for retrieving said retained record/spine assembly into said jacket; apparatus comprising:

(A) a first member mounted in said player; the location of said first member being such that a peripheral portion of said retained record is urged forward into engagement with said first member by an empty jacket, as said empty jacket is inserted into said player for record retrieval, to confine said record to said record receiving opening in said spine during said jacket insertion; and (B) means for retracting said first member out of said jacket insertion path just prior to any engagement between said jacket and said first member, as said empty jacket is inserted into said player, to allow further insertion of said jacket into said player.

5. Apparatus as defined in claim 4 wherein said retracting means is responsive to the insertion of said jacket into said player.

6. Apparatus as defined in claim 4 wherein said further portion of said spine includes at least one opening for receiving a portion of said first member.

7. Apparatus as defined in claim 4 wherein said apparatus further includes a second member; said retracting means additionally serving to retract said second member.

8. Apparatus as defined in claim 7 wherein said further portion of said spine includes two openings for respectively receiving a portion of said first member and a portion of said second member.

* * * * *